June 29, 1965 R. E. HERSEY 3,192,323
TELEPHONE SYSTEM DETECTION CIRCUIT
Filed June 6, 1960
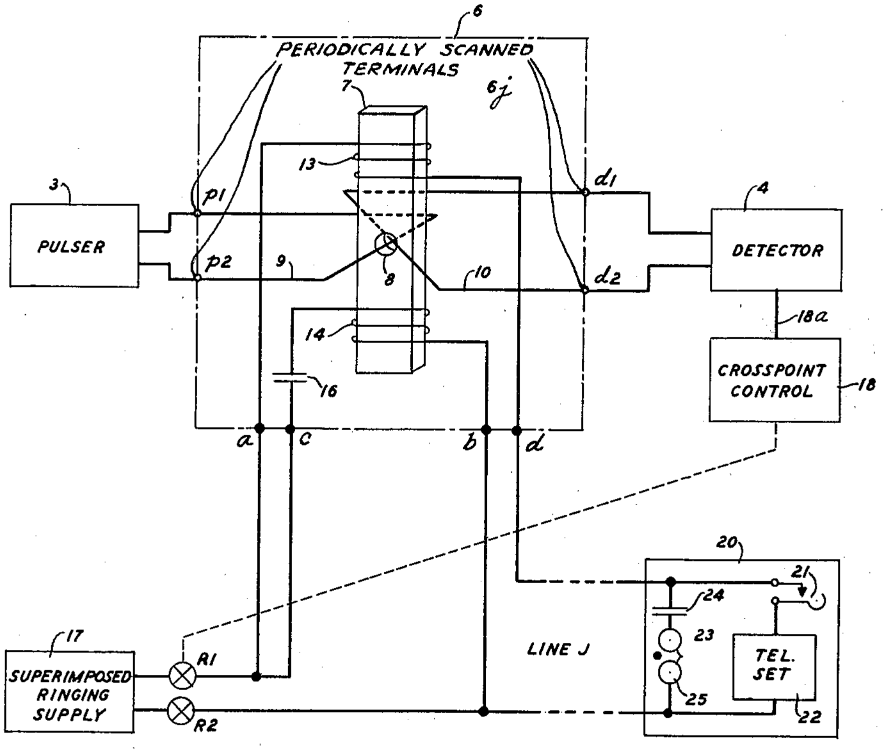
INVENTOR
R. E. HERSEY
BY
R. C. Winter
ATTORNEY 3,192,323
Patented June 29, 1965

3,192,323

TELEPHONE SYSTEM DETECTION CIRCUIT

Ralph E. Hersey, Denville, N.J., assignor to Bell Telephone Laboratories, Incorporated, New York, N.Y., a corporation of New York Filed June 6, 1960, Ser. No. 34,179
12 Claims. (Cl. 179—18)

This invention relates to detection circuits for automatic telephone systems and more particularly to circuits for initiating ringing tripping.

In effecting the completion of telephone connections between the calling and called party, it is customary to provide an alternating ringing current to actuate a ringer or other acoustic device at the called party's telephone set. The alternating current is periodically interrupted to enhance its attention getting properties, and in certain party line systems, to give the ringing signal a unique identifying characteristic. In either case, it is desirable that the ringing signal be immediately stopped when the called party removes the receiver from the switchhook whether the ringing signal has arrived at a silent interval or not. The process for automatically stopping the ringing current is called ringing tripping.

Many systems have heretofore been devised for accomplishing ringing tripping. These systems operate on the basis of an increase in line current effected by the closing of switchhook operated contacts at the called party's telephone set when that set is placed in the off-hook condition. More particularly, the increase in line current has been used to operate a marginal relay which passes on-hook ringing current without operating. Adjustment of alternating current carrying relays for marginal operation tends to be an uncertain and, in any event, a delicate processs.

The electronic switching system described for example in the Bell System Technical Journal for November 1958, and in the patent application of W. A. Budlong et al., Serial No. 688,386, filed October 17, 1957, now patent 2,955,165 issued October 4, 1960 requires line and trunk circuit supervisory equipment capable of high speed and reliable, unattended operation. To accomplish such supervision, the customer's lines are arranged for periodic scanning by grouping a plurality of transmission gates, each of which is associated with a respective customer's line, into an array. Circuits for interrogating and sensing are simultaneously connected in turn to each of the gates of the array. The scanned transmission gate couples the interrogation pulses to the detection circuit when the line associated with the transmission gate is the on-hook condition, and pulses are inhibited when the line is in the off-hook condition.

In the copending application of J. A. Baldwin, Jr. and H. F. May, Serial No. 26,758, filed May 4, 1960, now Patent No. 3,175,042, issued March 23, 1965, a simplified transmission gate circuit is disclosed which employs a magnetic sensing element possessing fast response and sensitive threshold characteristics. As therein described, the transmission gate supervisory array is adapted to distinguish between off-hook and on-hook conditions of the calling customer's line incident to the initiation of a telephone call. The magnetic element of the transmission gates comprises an elongated magnetic member having a transverse aperture and exhibiting remanent (rectangular hysteresis loop) switching characteristics about the periphery of the aperture and demagnetization characteristics in the longitudinal direction embracing the aperture. Interrogating and detecting circuit conductors are threaded through the aperture in linking relationship with the peripheral path about the aperture. Line currents are applied to windings positioned colinear to a longitudinal axis of the member, and, as determined by the over-all magnetization characteristics of the member, control the transmission, i.e., the coupling of the interrogation pulses into the detection circuit. It is an advantage of the Baldwin-May system that the interrogation pulses are isolated from the line circuit windings and hence inject no noise therein.

While the electronic switching system described in the above-mentioned articles is designed for use with the tone ringing and pushbutton calling handset described by L. A. Meacham, J. R. Power and F. West in an article entitled "Tone Ringing and Pushbutton Calling" in the March 1958 issue of the Bell System Technical Journal, it is apparent that it would be economically prohibitive to replace all the conventional telephone sets now in use with the tone ringing telephone set. On the other hand, it is desirable to provide standardized and simple central office equipment which possesses sufficient flexibility to be used with new as well as existing customer's equipment.

Accordingly, it is an object of the present invention to enhance the flexibility of electronic telephone switching systems by rendering such systems compatible with existing telephone equipment.

It is another object of the present invention to provide an improved means of telephone ringing tripping.

It is still another object of the present invention to provide an off-hook-during-ringing detection circuit which is adaptable for inclusion in a high speed supervisory system.

It is a further object of the present invention to provide a ringing tripping circuit which is suitable for long loops subjected to longitudinal current induction.

Accordnig to the principles of the present invention in one illustrative embodiment thereof, a high speed scanning array is adapted for supervision of a plurality of called customer's line during ringing by associating a transmission gate in the ringing circuit with a commutating pulser and detector circuit of the array. The transmission gate comprises an elongated ferromagnetic member having a transverse aperture and a pair of windings for exciting a nonremanent flux path embracing the aperture. Pulse interrogation and pulse detection circuit leads are passed through the aperture in linking relationship with a remanent, peripheral flux path. The called customer's line is selectively connected to one of the windings in series with a ringing generator. The other winding is connected to the ringing generator in series with a phase shift capacitor so that the A.C. components of ringing current in each winding provide balanced and out-of-phase axial fluxes embracing the aperture of the magnetic element. Accordingly, pulses applied to the interrogation circuit will be coupled into the detection circuit by means of flux changes effected around the periphery of the aperture when the called customer's set is in the on-hook condition prior to answer. The detection circuit, in response to the flux changes effected by the interrogation circuit, signals the control to maintain the ringing equipment in circuit with the called line.

When the called telephone set is taken off-hook at answer, the fluxes produced by the oppositely excited windings are caused to become unbalanced by the completion of a path for the D.C. component of the ringing current through one of the windings, and a net axial component is produced in the core which saturates the periphery of the aperture thereby inhibiting the tarnsfer of flux between interrogation and detection circuits. When pulses are no longer coupled to the detection circuit the detector provides no signal to the ringing control whereupon the ringing equipment is disconnected from the called customer's line.

It is a feature of the present invention that a telephone line circuit with the customer's station on-hook develop mutually opposing alternating-current components to prevent saturation of a remanent switching portion of a magnetic monitoring element upon the application of a ringing signal to the line and that the line circuit develop unbalanced components to effect saturation of the remanent switching portion when the customer's station goes off-hook.

It is another feature of the present invention that the ringing signal produce cancelling flux components about a dynamically interrogated aperture in a ferromagnetic member exhibiting square loop switching characteristics until a direct-current flux component is applied at answer.

It is another feature of the present invention that the windings of a transmission gate in a periodically scanned monitoring array of an electronic telephone switching system be connected to a ringing source to provide a first ringing current path through the called customer's line and a second ringing current path through a phase shifted circuit so that the introduction of any D.C. component in the first path will effect an immediate change in the monitored output of the scanned array.

The foregoing and other objects and features may be more readily understood by reference to the drawing, the single figure of which shows an illustrative embodiment of the present invention in schematic form.

In the above-described electronic switching system, the customer's lines are monitored by associating a supervisory transmission gate with each line and by synchronously commutating pulser and detector circuits among the gates which are arranged in an array for optimum scanning access. In the drawing, there is shown a pulser 3 and detector 4 of the type described in the aforementioned electronic switching system and additionally in the November 1958 issue of the Bell System Technical Journal at page 1395, FIG. 12. Pulser 3 and detector 4 are simultaneously connected to the respective terminals *p*1, *p*2 and *d*1, *d*2 of a transmission gate 6*j* of periodically scanned array 6. Transmission gate 6*j* is the gate of array 6 permanently associated with customer's line J. A corresponding transmission gate (not shown) will be associated with each of the other customer's lines of the telephone system and will present corresponding *p* and *d* terminals by means of which pulser 3 and detector 4 obtain periodic access to the array 6. For sake of simplicity, however, pulser 3 and detector 4 are shown at the instant of connection to the *p* and *d* terminals of transmission gate 6*j*, and the other supervisory elements and customer's lines are omitted from the drawing.

Transmission gate 6*j* comprises an elongated magnetic member 7 of the type described in the abovementioned copending application of Baldwin and May. Passing through aperture 8, which advantageously may be off-centered to obtain a desirable threshold switching characteristic as therein described, are conductor 9 connected to terminals *p*1 and *p*2 and conductor 10 connected to terminals *d*1 and *d*2. Disposed at opposite sides of aperture 8 are windings 13 and 14 for producing balanced flux components in that portion of member 7 embracing aperture 8. While the ends of each of windings 13 and 14 have been drawn spaced at some distance from the corresponding edges of aperture 8 so as to show more clearly conductors 9 and 10, it is to be understood that windings 13 and 14 advantageously may be positioned in close proximity to aperture 8. Winding 13 is connected between terminal *a* and terminal *d* of array 6, the latter terminal connecting to one side of customer's line J. Line J is terminated at a remote point by a customer's telephone set 20 which includes a normally open switchhook contact 21, handset 22 and ringing circuit 23. Circuit 23 includes a ringer or other electro-acoustic device 25 and a capacitor 24 for isolating ringer 25 from the D.C. line battery current upon which the A.C. ringing current is superimposed. Winding 14 is connected to phase shift capacitor 16 and to terminal *b* of array 6, the latter terminal connecting to the other side of line J.

Ringing current is supplied to line J thru winding 13 from superimposed ringing supply 17. Ringing supply 17 is connected to array 6 and line J via remotely controlled switching means such as crosspoints R1 and R2 which crosspoints are controlled by crosspoint control 18. Crosspoint control 18 which advantageously may be of the type described in the above-mentioned application of W.A. Budlong et al., operates under the direction of the central office program to operate crosspoints R1 and R2 in completing a call to line J. Crosspoint control 18 is also signalled by detector 4 over operating path 18*a* as hereinafter explained.

In operation, telephone set 20 will be assumed to be in the on-hook condition with ringing circuit 23 bridged across line J and contact 21 open circuited. Ringing supply 17 supplies ringing signal via crosspoint R1 and terminal *a* to winding 13 and ringer 25 and via crosspoint R1, terminal *c* and capacitor 16 to winding 14 to produce A.C. flux components of equal magnitude and opposite phase in the portion of member 7 embracing aperture 8 when telephone set 20 is being rung. The A.C. flux components cancel each other and effect no net saturation in member 7. Accordingly, pulses applied to conductor 9 by pulser 3 are effective to switch flux about the periphery of aperture 8 and the switching flux induces an E.M.F. in conductor 10 which is connected to detector 4.

When the called customer, in response to the audible ringing signal effected by ringing circuit 23, lifts the receiver from the switchhook, contact 21 is closed providing a direct-current path between the remote ends of line J. The presence of the D.C. branch, including contact 21 and telephone set 22 allows a direct current to flow through winding 13 causing saturation in the constricted portion of member 7 about aperture 8. Saturation of that portion of member 7 surrounding aperture 8 precludes the interrogation pulse applied over conductor 9 from switching any circumferential flux, and accordingly, no voltages will be induced in conductor 10. Detector 4, upon failing to receive energizing signals at terminals *d*1 and *d*2, signals crosspoint control 18 over path 18*a* to render crosspoints R1 and R2 nonconducting, thereby disconnecting ringing supply 17 from line J.

In the aforementioned electronic switching system remote concentrators and tone ringer telephone sets are employed. For operating the tone ringers, ringing signals are provided to these concentrators by transmitting audible frequency tones over the central office to concentrator links and by operating a central office controlled crosspoint at the concentrator to connect the link to the called party's line. In accordance with the principles of the present invention, telephone set equipment utilizing conventional 20 cycle A.C. ringers may be incorporated into such electronic switching systems by locating ringing supply 17 at the remote concentrator, by providing a ringing link between the central office and the concentrator, or in the case of unconcentrated lines, by locating the scanning, ringing supply and crosspoint control equipment at the central office.

It is further to be understood that the above described arrangements are illustrative of the application of the principles of the invention. Numerous other arrangements may be devised by those skilled in the art without departing from the spirit and scope of the invention.

What is claimed is:

1. In a telephone system, circuitry for initiating ringing tripping comprising a source of ringing signals, an elongated ferrite rod having an aperture transverse to a long dimension thereof, said aperture defining first and second portions of said rod along said dimension, a telephone line circuit having a switchhook-controlled direct coupled termination, a winding on said first portion of said rod directly connecting said source and said line, phase shift means exhibiting a high direct-current impedance, a winding on said second portion of said rod connecting said source and said phase shift means interrogating circuit means, and detection circuit means, each said last two mentioned means having a respective lead passing through said aperture, said detection circuit lead and said interrogation circuit lead being coupled when said termination is open-circuited and decoupled when said termination is close-circuited by said switchhook.

2. In a telephone system, the circuit for initiating ringing tripping in accordance with claim 1, wherein said winding on said first portion and said winding on said second portion are wound in the same sense on said rod.

3. In a telephone system, the circuit for initiating ringing tripping in accordance with claim 1, wherein said source includes a direct-current component, and wherein said direct coupled termination applies said direct current to said first-mentioned winding when said termination is close-circuited.

4. A telephone line circuit monitor for automatic ringing tripping comprising a magnetic member having an aperture therein and having at least a first and a second winding thereon, means for periodically interrogating said path to determine the switching state of said flux, a ringing supply having superimposed alternating and direct-current components and direct current connected to said first winding, circuit means for applying only said alternating component to said second winding on said member, a telephone set coupled to said first winding on said member and including a branch conductive only to said alternating component and a branch selectively conductive to said direct component, and switching means responsive to the current in said selectively conductive branch for disconnecting said ringing supply from said windings.

5. A telephone line circuit monitor for automatic ringing tripping in accordance with claim 4, wherein said magnetic member is elongated, said aperture defining a remanent peripheral flux switching path exhibiting rectangular hysteresis loop characteristics, said member having first and second nonremanent switching extensions adjoining said aperture, and wherein said first and said second windings are coupled to corresponding ones of said extensions and wound thereon in the same sense.

6. A telephone line circuit monitor for automatic ringing tripping in accordance with claim 5 wherein said circuit means comprises a capacitor serially connected between said second winding and said ringing supply.

7. A detection circuit comprising an elongated ferromagnetic member defining first and at least a second magnetic path embraced by said first path, said first path exhibiting demagnetization characteristics and said second path exhibiting remanence characteristics, a source of ringing signal current, a first and a second solenoid for axially magnetizing said member, equipment means connected to said source and said first solenoid, said equipment means having operated and nonoperated conditions, capacitor means connecting said source and said second solenoid, interrogation circuit means for switching the remanent state of said second path, detector means associated with said second path for detecting changes in said remanent state when said equipment means is in said nonoperated condition, and means controlled by said detector means for disconnecting said source from said equipment means when said equipment means is in said operated condition.

8. A detection circuit according to claim 7, wherein said equipment means includes direct-current blocking means, and means effective during said operated condition for bridging said blocking means.

9. In a telephone system, a telephoning set, a magnetizable member associated with said set and having an aperture therein, interrogation and detection means inductively coupled through said aperture, a source of ringing current, means including a first winding on said member direct-current coupling said source to said telephone set, and direct-current blocking means coupled to said source and including a second winding on said member for applying to said member currents balanced with and opposite in phase to the currents in said first winding from said source whereby the fluxes in said member due to ringing currents in said first and second windings substantially cancel each other, said member being magnetically saturated on closure of a direct-current path to said telephone set through said first winding.

10. In a telephone system, a magnetizable member having an aperture therein, interrogation and detection means inductively coupled through said aperture, a source of ringing and direct currents, telephone equipment responsive to said ringing currents and normally open-circuited to said direct current, a first winding on said member direct-current coupling said source and said equipment, a second winding on said member and connected to said source for applying ringing currents to said member out-of-phase with the ringing currents applied to said member by said first winding, and means in said telephone equipment for establishing a direct-current path to said source through said first winding, said direct current flowing through said first winding saturating said magnetizable member.

11. In a telephone system, the combination set forth in claim 10 further comprising a capacitor connecting said second winding and said source to isolate said second winding from said direct current and to provide the out-of-phase relationship between the ringing currents in said first and second windings.

12. In a telephone switching system, a customer's line circuit, means for applying to said circuit a superimposed ringing current having a direct-current voltage component, a magnetic member having first and second branch current paths connected in circuit with said ringing current applying means, said ringing current having components normally balanced between said paths, means at said line circuit for rendering one of said branch paths conductive to said direct-current voltage to unbalance said ringing current between said paths, switching means in circuit with said first-mentioned means, and means periodically coupled to said magnetic member and responsive to the conduction of said direct current in said one of said paths for controlling said switching means to interrupt said ringing current.

References Cited by the Examiner

UNITED STATES PATENTS

| | | | |
|---|---|---|---|
| 2,152,475 | 3/39 | Halligan | 179—18 |
| 2,504,641 | 4/50 | Burgener | 179—18 |
| 2,594,726 | 4/52 | Burgener | 179—18 |
| 2,805,407 | 9/57 | Wallace | 340—174 |
| 2,938,129 | 5/60 | House | 307—88 |
| 2,976,472 | 3/61 | Newhall et. al | 340—174 |
| 3,024,447 | 3/62 | Abbott | 340—174 |

OTHER REFERENCES

"The Transfluxor—A Magnetic Gate With Stored Variable Setting," by Rajchman and Lo, 8 pp. R. C. A. Review, June 1955, pages 303-311.

ROBERT H. ROSE, *Primary Examiner.*

L. MILLER ANDRUS, WALTER L. LYNDE, *Examiners.*